May 28, 1940.  F. F. MACIEL  2,202,460
SHOCK ABSORBER FOR MOTOR VEHICLES
Filed Nov. 20, 1937
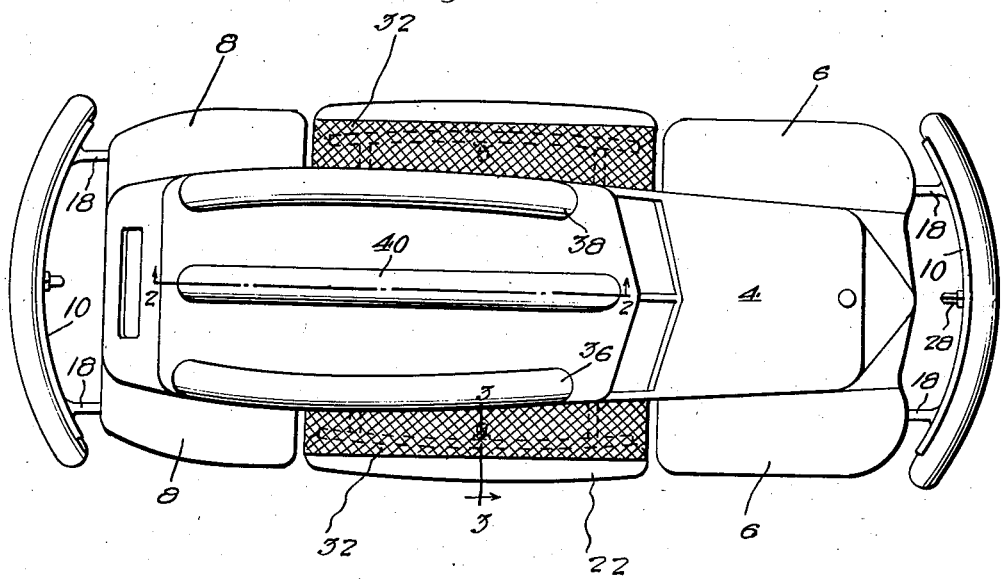
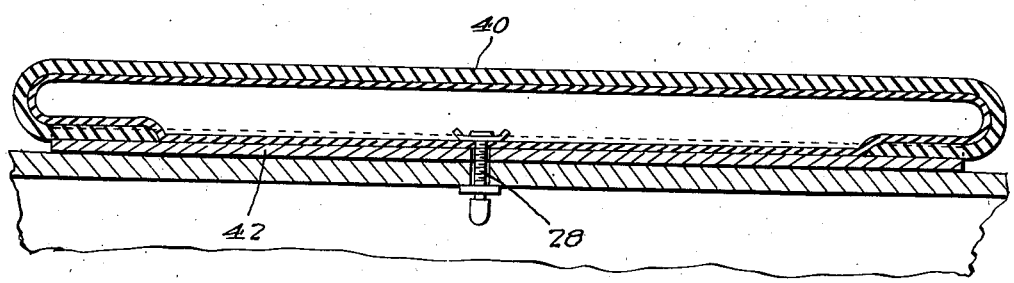
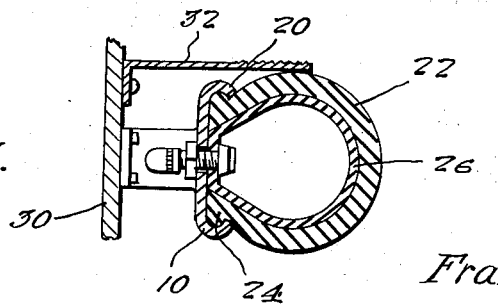
Inventor.
Frank F. Maciel Patented May 28, 1940

2,202,460

UNITED STATES PATENT OFFICE 2,202,460

SHOCK ABSORBER FOR MOTOR VEHICLES

Frank F. Maciel, Antioch, Calif.

Application November 20, 1937, Serial No. 175,721

1 Claim. (Cl. 293—57)

The present invention relates to a shock absorber for motor vehicles and more particularly to a novel arrangement of the shock absorbers thereon for protecting the motor vehicle and safeguarding the lives of the passengers thereof.

One of the objects of the present invention is to provide in combination with a motor vehicle, a novelly constructed pneumatic shock absorber or bumper.

A still further important object of the invention is to provide in combination with a motor vehicle shock absorbers arranged in a novel manner thereon for protecting the sides, top and front portions of the motor vehicle body, as well as safeguarding the lives of the passengers thereof.

A still further important object of the invention is to provide a novelly constructed pneumatic bumper arranged in the manner described which is cheap to manufacture, easy to install, and relatively durable in use.

In the accompanying drawing wherein corresponding parts are designated by similar reference numerals, Figure 1 is a top plan view of a motor vehicle illustrating the novel manner in which the bumpers are arranged thereon, Figure 2 is a longitudinal sectional view of Figure 1 taken on line 2—2 thereof looking in the direction of the arrows, and Figure 3 is a vertical sectional view of the front bumper taken on line 3—3 thereof.

In the accompanying drawing wherein for the purpose of illustration there is shown a preferred embodiment of the invention, the reference numeral 4 generally designates a motor vehicle body which may be of any construction, but which in the present instance is shown to be of the enclosed type.

The motor vehicle is provided with front fenders 6 and rear fenders 8 in the usual manner. On the front of the car there is secured a bumper 10, this bumper 10 is of general arcuate-shape and is secured to the front of the motor vehicle by means of laterally extending integral support 18.

In the same manner, a bumper frame of similar construction is secured to the rear of the motor vehicle.

Referring now to Figure 3 of the drawing it will be observed that the bumper 10 is provided with inwardly directed pressure side walls 20 constructed in substantially the same fashion as the ordinary type of clincher side rim. By virtue of the inwardly directed clincher side wall the frame 10 is adapted to receive a rubber casing 22 constructed in the same side of the ordinary type of clincher tire and adapted to be received in the bumper frame 10 so that its clincher side walls 24 engage with the clincher wall 20 of the bumper frame. A pneumatic tube 26 is disposed within the casing 22 and the inlet valve extends through an aperture located on the frame and is designated by the reference numeral 28.

As show in Figure 3 a bumper frame of similar construction is secured to each side 30 of the motor vehicle projecting beyond the step board 32 and forming a support for the outer portion thereof. In will be observed that the bumper, therefore, has a twofold use of forming a support for the running board and at the same time fully protecting the same, as well as the remaining side portion of the motor vehicle.

A bumper of substantially similar construction is shown secured to the top of the motor vehicle. While in the present illustration there is shown three spacedly disposed bumpers, bumpers 36 and 38 being disposed adjacent the longitudinal edge of the top and bumper 40 substantially longitudinally centrally thereof. The bumper casing is of substantially the same construction as the casing previously described and in the same manner is secured in the clincher side walls of the bumper frame 42 which is secured to the top of the motor vehicle. Each of the bumper frames 42 is secured flush to the top of the motor vehicle thereof and are provided with centrally disposed apertures through which project the inlet valve 28 of the respective inner tube. It will be observed that the inlet valve 28 of the bumpers on the top of the motor vehicle extends through apertures in the top of the motor vehicle thereof so that the same may be inflated from the inside of the motor vehicle body.

It will thus be apparent that a bumper of this construction and the bumpers arranged in the manner previously described completely prevent serious damage to substantially all parts of the motor vehicle and at the same time whether through contact with any foreign object or the complete turning over of the motor vehicle safeguards the lives of the passengers.

While there is shown for the purpose of illustration a preferred embodiment of the invention it is to be understood that it is capable of various changes and modifications without departing from the spirit and scope thereof, and it is intended, therefore, that only such limitations shall be imposed thereon, as are indicated in the prior art or in the appended claim.

Having thus described the invention, what is claimed as new is:

In combination with a motor vehicle having side running boards and a top structure, a longitudinally extending pneumatic bumper guard mounted adjacent each running board, a longitudinally extending pneumatic bumper guard on the top structure adjacent each side thereof, a longitudinally extending pneumatic bumper guard on the top structure disposed centrally thereof, said pneumatic bumper guards projecting beyond the surfaces of the motor vehicle.

FRANK F. MACIEL.